(12) United States Patent
Meloche

(10) Patent No.: US 11,540,670 B2
(45) Date of Patent: Jan. 3, 2023

(54) MICROWAVE WHISK ASSEMBLY

(71) Applicant: Stephane Meloche, Plantagenet (CA)

(72) Inventor: Stephane Meloche, Plantagenet (CA)

( * ) Notice: Subject to any disclaimer, the term of this patent is extended or adjusted under 35 U.S.C. 154(b) by 835 days.

(21) Appl. No.: 16/437,189

(22) Filed: Jun. 11, 2019

(65) Prior Publication Data

US 2020/0390288 A1 Dec. 17, 2020

(51) Int. Cl.
*H05B 6/64* (2006.01)
*H05B 6/54* (2006.01)
*A47J 43/10* (2006.01)
*H05B 6/78* (2006.01)
*A47J 45/02* (2006.01)

(52) U.S. Cl.
CPC .......... *A47J 43/1093* (2013.01); *A47J 45/02* (2013.01); *H05B 6/6411* (2013.01); *H05B 6/782* (2013.01)

(58) Field of Classification Search
CPC ..... A47J 43/1093; A47J 45/02; H05B 6/6411; H05B 6/782
USPC ....... 219/726, 725, 738, 685, 751, 752, 753, 219/754, 755, 756, 762; 426/241, 243, 426/107; 366/204, 146, 282, 213, 231, 366/144, 233, 228; 99/348, DIG. 14, 451
See application file for complete search history.

(56) References Cited

U.S. PATENT DOCUMENTS

| | | | | |
|---|---|---|---|---|
| 1,373,761 | A | * | 4/1921 | Rabin .................... A47J 43/105 366/252 |
| 2,269,301 | A | * | 1/1942 | Anstice ............... B01F 27/1126 366/98 |
| 2,325,434 | A | * | 7/1943 | Stiles ...................... A47J 43/07 279/157 |
| 4,904,834 | A | | 2/1990 | Bowen |
| 4,952,069 | A | | 8/1990 | Boulard |
| 5,021,621 | A | | 6/1991 | Demmer |
| 6,933,484 | B2 | | 8/2005 | Lindley |
| 7,022,956 | B2 | | 4/2006 | Greenstreet |
| D607,264 | S | | 1/2010 | Lee |
| 9,173,516 | B1 | | 11/2015 | Messer |
| 2004/0025706 | A1 | | 2/2004 | Greenstreet |
| 2012/0213030 | A1 | | 8/2012 | Cheung |

* cited by examiner

*Primary Examiner* — Quang T Van

(57) ABSTRACT

A microwave whisk assembly for mixing food while in the microwave includes a whisk body having a top end and a bottom end. The bottom end has a receiving cavity extending towards the top end. A suction cup is coupled to the top end and is configured to selectively engage a roof of a microwave. Each of a plurality of whisk attachments includes an engagement shaft and a mixer extension. The engagement shaft has an upper end and a lower end. The engagement shall conforms to, and is selectively engageable with, the receiving cavity of the whisk body. The mixer extension is coupled to the lower end of the engagement shaft and is configured to mix the contents of a bowl rotating within the microwave.

9 Claims, 4 Drawing Sheets

MICROWAVE WHISK ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to culinary accessories and more particularly pertains to a new culinary accessory for mixing food while in the microwave.

BRIEF SUMMARY OF THE INVENTION

An embodiment of the disclosure meets the needs presented above by generally comprising a whisk body having a top end and a bottom end. The bottom end has a receiving cavity extending towards the top end. A suction cup is coupled to the top end and is configured to selectively engage a roof of a microwave. Each of a plurality of whisk attachments comprises an engagement shaft and a mixer extension. The engagement shaft has an upper end and a lower end. The engagement shaft conforms to, and is selectively engageable with, the receiving cavity of the whisk body. The mixer extension is coupled to the lower end of the engagement shaft and is configured to mix the contents of a bowl rotating within the microwave.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
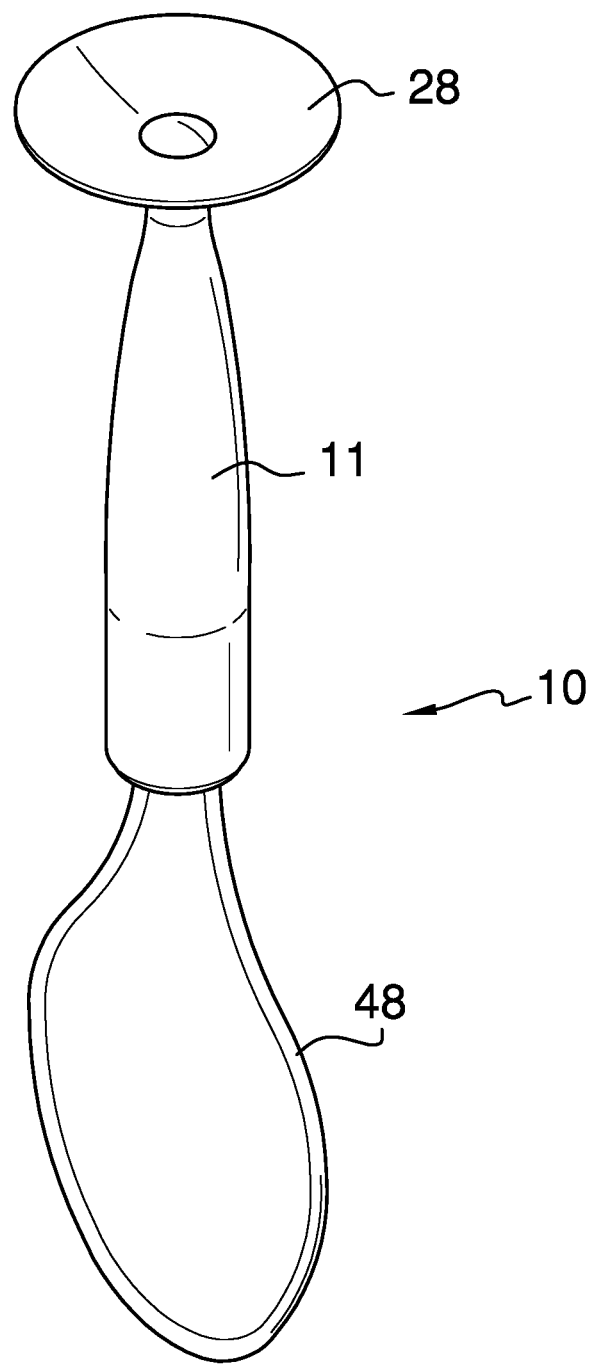
FIG. 1 is an isometric view of a microwave whisk assembly according to an embodiment of the disclosure.
Figure 2:
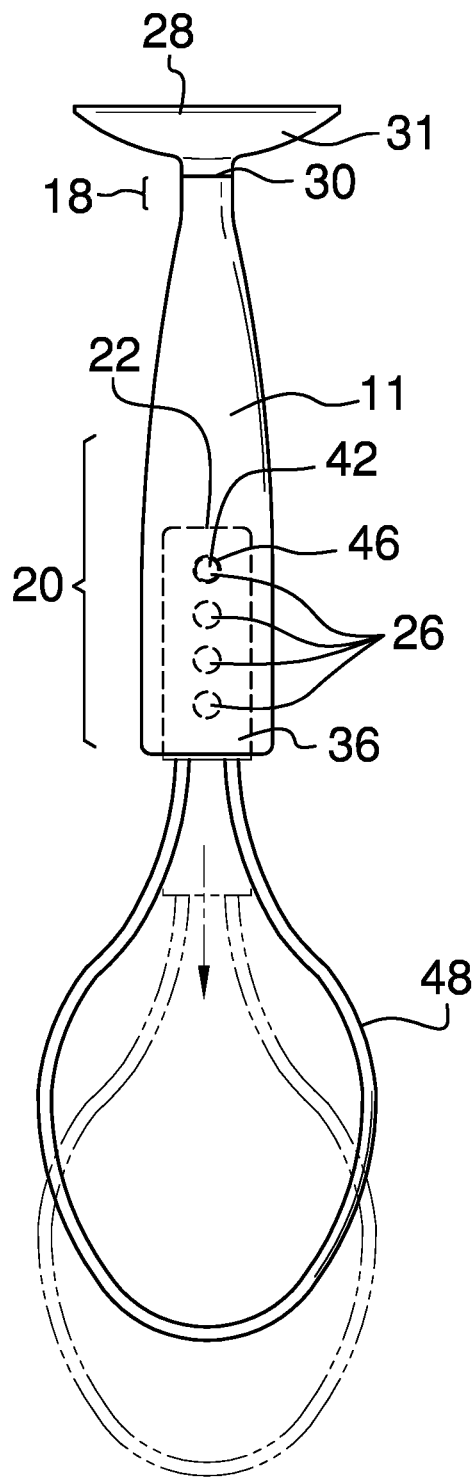
FIG. 2 is a front elevation view of an embodiment of the disclosure.
Figure 3:
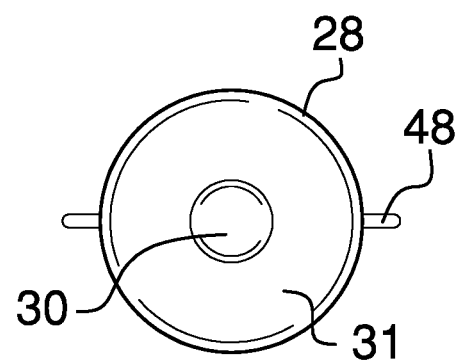
FIG. 3 is a top plan view of an embodiment of the disclosure.
Figure 4:
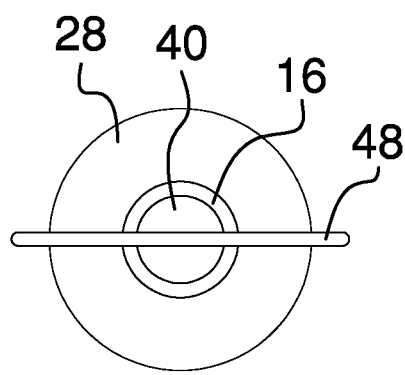
FIG. 4 is a bottom plan view of an embodiment of the disclosure.
Figure 5:
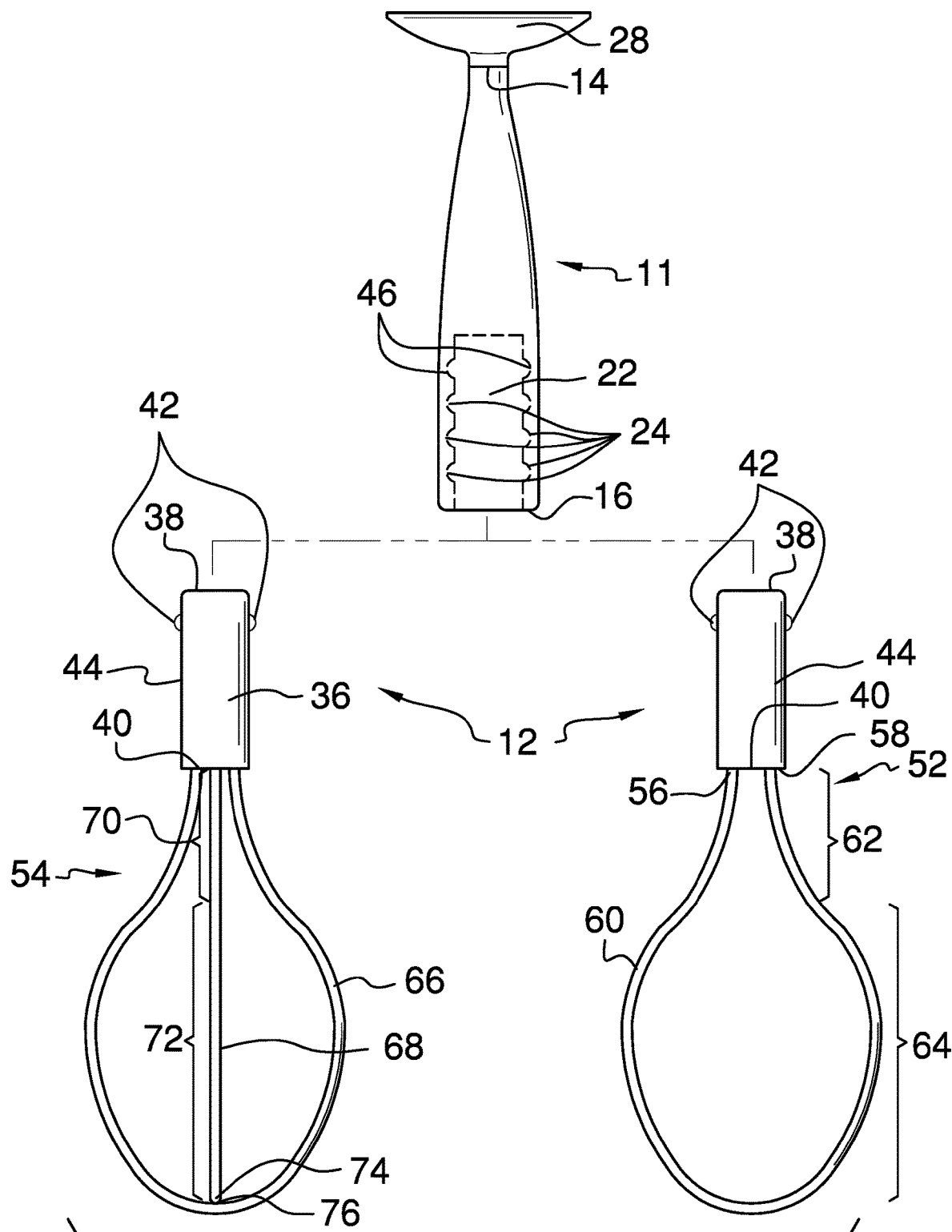
FIG. 5 is an exploded view of an embodiment of the disclosure.
Figure 6:
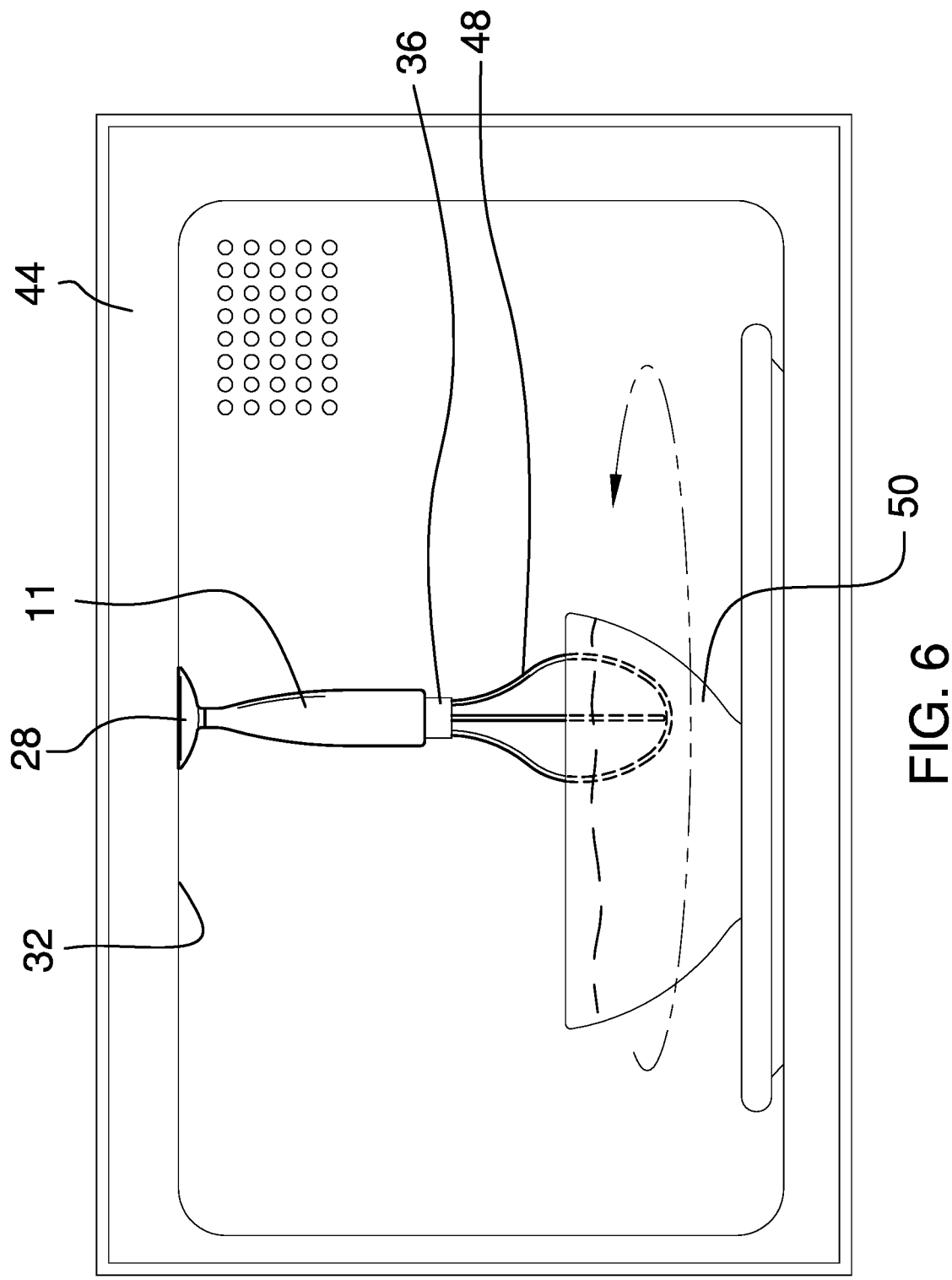
FIG. 6 is an in-use view of an embodiment of the disclosure.

With reference now to the drawings, and in particular to FIGS. 1 through 6 thereof, a new culinary accessory embodying the principles and concepts of an embodiment of the disclosure and generally designated by the reference numeral 10 will be described.

As best illustrated in FIGS. 1 through 6, the microwave whisk assembly 10 generally comprises a whisk body 11 and a plurality of whisk attachments 12. The whisk body 11 has a top end 14 and a bottom end 16. The whisk body 11 has a thin cylindrical top portion 18 adjacent the top end 14 and a wider cylindrical bottom portion 20 adjacent the bottom end 16. The whisk body 11 tapers from the top portion 18 to the bottom portion 20. The bottom end 16 has a receiving cavity 22 extending towards the top end 14. The receiving cavity 22 has a plurality of hemispherical indents 24 comprising a plurality of indent pair tiers 26. Each indent of each indent pair tier 26 is spaced 180° apart within the receiving cavity. There may be four indent pair tiers 26. A suction cup 28 coupled to the whisk body 11. The suction cup 28 has a neck portion 30 coupled to the top end 14 and a cup portion 31 configured to selectively engage a roof 32 of a microwave 34. The neck portion 30 may be the same width as the top portion 18.

Each of the plurality of whisk attachments 12 comprises an engagement shaft 36 having an upper end 38 and a lower end 40. The engagement shaft 36 conforms to, and is selectively engageable with, the receiving cavity 22 of the whisk body. The engagement shaft 36 is cylindrical and has at least one hemispherical protrusion 42 extending from a sidewall 44 proximal the upper end 38. The at least one protrusion 42 may be a pair of protrusions 42 spaced 180° apart on the sidewall 44 corresponding to, and selectively engaging, the plurality of indent pair tiers 26. Each indent pair tier 26 receives the pair of protrusions 42 to create a variable overall length from the top end 14 of the whisk body to the lower end 40 of the engagement shaft and thus a variable overall length of the assembly 10. An upper tier 46 of the plurality of indent pair tiers 26 secures the engagement shaft 36 such that is entirely engaged within the receiving cavity 22. The whisk body 11 may be flexible and the engagement shaft 36 rigid such that the whisk body 11 is sufficiently flexible to allow the pair of protrusions 42 to pass between the plurality of indent pair tiers 26. The whisk body 11 and the engagement shaft 36 may alternatively both be rigid with each of the pair of protrusions 42 being springingly depressible within the engagement shaft 36 to allow movement between the plurality of indent pair tiers 26. A mixer extension 48 is coupled to the lower end 40 of the engagement shaft and is configured to mix the contents of a bowl 50 rotating within the microwave 34.

The plurality of whisk attachments 12 comprises a single loop whisk attachment 52 and a double loop whisk attachment 54. The mixer extension 48 of the single loop whisk attachment 52 has a left end 56 and a right end 58 coupled to the lower end 40 of the engagement shaft and extending away in a vertically symmetrical manner to form a single loop 60 comprising a single loop neck portion 62 and a single loop head portion 64. The single loop 60 may shaped similarly to a tennis racket frame. The mixer extension 48 of the double loop whisk attachment 54 has a first loop 66 identical to the single loop 60 of the single loop whisk attachment 52 and a second loop 68 nearly identical to the single loop 60 and comprising a second loop neck portion 70 and a second loop head portion 72 slightly more compressed than the first loop neck portion 62 and the first loop head portion 64, respectively. The second loop 68 lies in a plane perpendicular with a plane of the first loop 66 and a distal end 74 of the second loop head portion contacts an inner edge 76 of the first loop.

In use, a whisk attachment 12 is selected and the engagement shaft 36 is inserted into the receiving cavity 22 until the pair of protrusions 42 engages one of the plurality of indent pair tiers 26 to create the desired length of the assembly 10. The suction cup 28 is then engaged to the roof 32 of the microwave and the bowl 50 is placed with the mixer extension 48 therein. The microwave 34 is then operated to spin the bowl 50.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A microwave whisk assembly comprising:
    a whisk body, the whisk body having a top end and a bottom end, the bottom end having a receiving cavity extending towards the top end;
    a suction cup coupled to the whisk body, the suction cup being coupled to the top end and configured to selectively engage a roof of a microwave; and
    a plurality of whisk attachments, each of the plurality of whisk attachments comprising:
        an engagement shaft, the engagement shaft having an upper end and a lower end, the engagement shaft conforming to, and being selectively engageable with, the receiving cavity of the whisk body;
        a mixer extension, the mixer extension being coupled to the lower end of the engagement shaft, the mixer extension being configured to mix the contents of a bowl rotating within the microwave;
        the engagement shaft being cylindrical and having at least one protrusion extending from a sidewall proximal the upper end, the receiving cavity having a plurality of indents corresponding to the at least one protrusion, the at least one protrusion selectively engaging the plurality of indents; and
        the at least one protrusion being a pair of protrusions 180° apart on the sidewall, the plurality of indents comprising a plurality of indent pair tiers, each indent of each indent pair tier being 180° apart within the receiving cavity, each indent pair tier receiving the pair of protrusions to create a variable overall length from the top end of the whisk body to the lower end of the engagement shaft, an upper tier of the plurality of indent pair tiers securing the engagement shaft such that is entirely engaged within the receiving cavity.

2. The microwave whisk assembly of claim 1 wherein the plurality of whisk attachments comprises a single loop whisk attachment, the mixer extension of the single loop whisk attachment having a left end and a right end coupled to the lower end of the engagement shaft and extending away in a vertically symmetrical manner forming a single loop comprising a single loop neck portion and a single loop head portion.

3. The microwave whisk assembly of claim 2 wherein the plurality of whisk attachments further comprises a double loop whisk attachment, the mixer extension of the double loop whisk attachment having a first loop identical to the single loop of the single loop whisk attachment and a second loop comprising a second loop neck portion and a second loop head portion; the second loop lying in a plane perpendicular with a plane of the first loop, a distal end of the second loop head portion contacting an inner edge of the first loop.

4. The microwave whisk assembly of claim 1 further comprising the plurality of indent pair tiers being four tiers.

5. The microwave whisk assembly of claim 1 further comprising the whisk body being flexible and each of the plurality of whisk attachments being rigid, the whisk body being sufficiently flexible to allow the pair of protrusions to pass between the plurality of indent pair tiers.

6. The microwave whisk assembly of claim 1 further comprising the whisk body being rigid and each of the plurality of whisk attachments being rigid, each of the pair of protrusions being springingly depressible within the engagement shah.

7. The microwave whisk assembly of claim 1 further comprising the whisk body having a thin cylindrical top portion adjacent the top end and a wider cylindrical bottom portion adjacent the bottom end, the whisk body tapering from the top portion to the bottom portion.

8. A microwave whisk assembly comprising:
a whisk body, the whisk body having a top end and a bottom end the bottom end having a receiving cavity extending towards the top end;
a suction cup coupled to the whisk body, the suction cup being coupled to the top end and configured to selectively engage a roof of a microwave; and
a plurality of whisk attachments, each of the plurality of whisk attachments comprising:
  an engagement shaft, the engagement shaft having an upper end and a lower end, the engagement shaft conforming to, and being selectively engageable with, the receiving cavity of the whisk body;
  a mixer extension, the mixer extension being coupled to the lower end of the engagement shaft, the mixer extension being configured to mix the contents of a bowl rotating within the microwave;
  the engagement shaft being cylindrical and having at least one protrusion extending from a sidewall proximal the upper end, the receiving cavity having a plurality of indents corresponding to the at least one protrusion, the at least one protrusion selectively engaging the plurality of indents; and
  the at least one protrusion being a pair of protrusions, each of the pair of protrusions and each of the plurality of indents being hemispherical.

9. A microwave whisk assembly comprising:
a whisk body, the whisk body having a top end and a bottom end, the whisk body having a thin cylindrical top portion adjacent the top end and a wider cylindrical bottom portion adjacent the bottom end, the whisk body tapering from the top portion to the bottom portion, the bottom end having a receiving cavity extending towards the top end, the receiving cavity having a plurality of hemispherical indents comprising a plurality of indent pair tiers, each indent of each indent pair tier being 180° apart within the receiving cavity;
a suction cup coupled to the whisk body, the suction cup being coupled to the top end and configured to selectively engage a roof of a microwave; and
a plurality of whisk attachments, each of the plurality of whisk attachments comprising:
  an engagement shaft, the engagement shaft having an upper end and a lower end, the engagement shaft conforming to, and being selectively engageable with, the receiving cavity of the whisk body, the engagement shaft being cylindrical and having at least one hemispherical protrusion extending from a sidewall proximal the upper end, the at least one protrusion being a pair of protrusions 180° apart on the sidewall and corresponding to, and selectively engaging, the plurality of indent pair tiers, each indent pair tier receiving the pair of protrusions to create a variable overall length from the top end of the whisk body to the lower end of the engagement shaft, an upper tier of the plurality of indent pair tiers securing the engagement shaft such that is entirely engaged within the receiving cavity, the whisk body being flexible and the engagement shaft being rigid, the whisk body being sufficiently, flexible to allow the pair of protrusions to pass between the plurality of indent pair tiers; and
  a mixer extension, the mixer extension being coupled to the lower end of the engagement shaft, the mixer extension being configured to mix the contents of a bowl rotating within the microwave;
the plurality of whisk attachments comprising:
a single loop whisk attachment, the mixer extension of the single loop whisk attachment having a left end and a right end coupled to the lower end of the engagement shaft and extending away in a vertically symmetrical manner forming a single loop comprising a single loop neck portion and a single loop head portion; and
a double loop whisk attachment, the mixer extension of the double loop whisk attachment having a first loop identical to the single loop of the single loop whisk attachment and a second loop comprising a second loop neck portion and a second loop head portion, the second loop lying in a plane perpendicular with a plane of the first loop, a distal end of the second loop head portion contacting an inner edge of the first loop.

* * * * *